(12) United States Patent
Pang et al.

(10) Patent No.: US 10,231,005 B2
(45) Date of Patent: Mar. 12, 2019

(54) OPERATION INSTRUCTING METHOD AND APPARATUS FOR REMOTE CONTROLLER OF INTELLIGENT TELEVISION

(71) Applicant: STARTIMES COMMUNICATION NETWORK TECHNOLOGY CO., LTD., Beijing (CN)

(72) Inventors: Yi Pang, Beijing (CN); Yixing Zeng, Beijing (CN); Jiangtao Wen, Beijing (CN); Hongwei Yao, Beijing (CN)

(73) Assignee: STARTIMES COMMUNICATION NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/308,990

(22) PCT Filed: Apr. 13, 2015

(86) PCT No.: PCT/CN2015/076407
§ 371 (c)(1),
(2) Date: Jan. 26, 2017

(87) PCT Pub. No.: WO2015/169138
PCT Pub. Date: Nov. 12, 2015

(65) Prior Publication Data
US 2017/0134789 A1    May 11, 2017

(30) Foreign Application Priority Data

May 5, 2014    (CN) .......................... 2014 1 0186245

(51) Int. Cl.
*H04N 5/445*    (2011.01)
*G06F 3/00*    (2006.01)
(Continued)

(52) U.S. Cl.
CPC ..... *H04N 21/42204* (2013.01); *H04N 5/4403* (2013.01); *H04N 5/445* (2013.01);
(Continued)

(58) Field of Classification Search
CPC ............. H04N 5/44543; H04N 21/482; H04N 1/00384; H04N 21/4221; H04N 21/42218;
(Continued)

(56) References Cited

U.S. PATENT DOCUMENTS

| 5,936,611 A * | 8/1999 | Yoshida | G08C 23/04 345/158 |
| 6,795,011 B1 * | 9/2004 | Berthoud | G08C 17/02 341/173 |

(Continued)

FOREIGN PATENT DOCUMENTS

| CN | 101515991 A | 8/2009 |
| CN | 102547173 A | 7/2012 |
| CN | 102740134 A | 10/2012 |

OTHER PUBLICATIONS

PCT International Search Report and Written Opinion dated Jun. 29, 2015, issued in corresponding International Application No. PCT/CN2015/076407 (10 pages).

(Continued)

*Primary Examiner* — Jason P Salce
(74) *Attorney, Agent, or Firm* — Morgan, Lewis & Bockius LLP (57) ABSTRACT

The present disclosure provides an operation instructing method and apparatus for a remote controller of an intelligent television, relating to the technical field of intelligent television. The method comprises: receiving an operation instruction from the remote controller; judging whether a user operation satisfies a preset instruction condition accord-
(Continued)

ing to the operation instruction; and if so, displaying operation instruction information of the remote controller on a user operation interface, the operation instruction information being indicative of an operation of the remote controller. The present disclosure can solve the problem that since the service contents in the current intelligent television are numerous, and the operation mode varies with the service content, a misoperation will easily occur when certain service content is operated in a conventional operation mode, and the application of the service content is tedious and complex.

10 Claims, 4 Drawing Sheets

(51) Int. Cl.
    *G06F 13/00*     (2006.01)
    *H04N 21/422*     (2011.01)
    *H04N 5/44*     (2011.01)
    *H04N 21/442*     (2011.01)
    *H04N 21/488*     (2011.01)
    *H04N 21/61*     (2011.01)
    *H04N 21/472*     (2011.01)

(52) U.S. Cl.
    CPC . *H04N 21/42215* (2013.01); *H04N 21/44222* (2013.01); *H04N 21/472* (2013.01); *H04N 21/4882* (2013.01); *H04N 21/6125* (2013.01); *H04N 21/6175* (2013.01); *H04N 2005/4444* (2013.01)

(58) Field of Classification Search
    CPC ......... H04N 21/4222; H04N 21/42224; H04N 21/4126; H04N 21/42227; H04N 5/44582; H04N 2005/4441
    See application file for complete search history.

(56) References Cited

U.S. PATENT DOCUMENTS

| | | | |
|---|---|---|---|
| 2004/0117831 A1* | 6/2004 | Ellis | H04N 5/44543 725/53 |
| 2008/0001773 A1* | 1/2008 | Rye | G08C 17/00 340/4.31 |
| 2008/0088748 A1 | 4/2008 | Lim | |
| 2009/0165060 A1* | 6/2009 | Lawrence | H04N 5/4403 725/81 |
| 2010/0306708 A1* | 12/2010 | Trenz | G06F 3/0482 715/853 |
| 2012/0105320 A1* | 5/2012 | Yano | G06F 3/038 345/157 |

OTHER PUBLICATIONS

PCT International Preliminary Report on Patentability dated Sep. 5, 2016, issued in corresponding International Application No. PCT/CN2015/076407 (16 pages).

\* cited by examiner

OPERATION INSTRUCTING METHOD AND APPARATUS FOR REMOTE CONTROLLER OF INTELLIGENT TELEVISION

CLAIM FOR PRIORITY

This application is a U.S. national phase entry under 35 U.S.C. § 371 from PCT International Application No. PCT/CN2015/076407 filed on Apr. 13, 2015, which is based upon and claims the benefit of priority from the prior Chinese Patent Application No. 201410186245.8, filed on May 5, 2014. The entire contents of the above applications are incorporated herein by reference.

TECHNICAL FIELD

The present disclosure relates to the field of intelligent television, and particularly, to an operation instructing method and apparatus for a remote controller of an intelligent television.

BACKGROUND

Currently, as compared with the traditional television, the collocation of the intelligent television and the set-top box owns more service contents and becomes a diversified platform. For example, at present, the system composed of the intelligent television and the set-top box has the functions of live video, television game, video on demand, broadcast, etc.

With the diversification of the service contents in the intelligent television, the operation of the intelligent television becomes more complex. Thus, the current user may not acquire how to specifically perform an operation when applying some service contents, which leads to the user's misoperation. It is clear that since the service contents in the current intelligent television are numerous, and the operation mode varies with the service content, a misoperation will easily occur when certain service content is operated in a conventional operation mode, and the application of the service content is tedious and complex.

SUMMARY OF THE DISCLOSURE

The embodiments of the present disclosure provide an operation instructing method and apparatus for a remote controller of an intelligent television, so as to solve the above problem in the prior art that since the service contents in the current intelligent television are numerous, and the operation mode varies with the service content, a misoperation will easily occur when certain service content is operated in a conventional operation mode, and the application of the service content is tedious and complex.

In order to achieve the above objective, the present disclosure adopts the following technical solutions.

An operation instructing method for a remote controller of an intelligent television, including:

receiving an operation instruction from the remote controller;

judging whether a user operation satisfies a preset instruction condition according to the operation instruction;

if the user operation satisfies the preset instruction condition, displaying operation instruction information of the remote controller on a user operation interface, the operation instruction information being indicative of an operation of the remote controller.

Specifically, the judging whether a user operation satisfies a preset instruction condition according to the operation instruction includes:

judging whether an operation record of a service content corresponding to the operation instruction is locally stored.

Further, if the user operation satisfies the preset instruction condition, displaying operation instruction information of the remote controller on a user operation interface includes:

if no operation record of the service content is locally stored, displaying the operation instruction information of the remote controller on the user operation interface, wherein, the operation instruction information of the remote controller includes corresponding function prompt information of each key of the remote controller in the service content, and operation method prompt information for each function in the service content.

In addition, the operation instructing method for a remote controller of an intelligent television further includes:

if an operation record of the service content is locally stored, acquiring the latest operation time corresponding to the operation record;

judging whether the time difference between the latest operation time and the current time is larger than a preset time threshold.

Specifically, if the user operation satisfies the preset instruction condition, the displaying operation instruction information of the remote controller on a user operation interface includes:

if the time difference is larger than the preset time threshold, displaying the operation instruction information of the remote controller on the user operation interface, wherein, the operation instruction information of the remote controller includes corresponding function prompt information of each key of the remote controller in the service content, and operation method prompt information for each function in the service content.

Specifically, the judging whether a user operation satisfies a preset instruction condition according to the operation instruction includes:

judging whether the number of misoperations on a service content locally stored is larger than or equal to a preset misoperation number threshold.

Specifically, if the user operation satisfies the preset instruction condition, the displaying operation instruction information of the remote controller on a user operation interface includes:

if the number of misoperations on the service content is larger than or equal to the misoperation number threshold, displaying the operation instruction information of the remote controller on the user operation interface, wherein, the operation instruction information of the remote controller includes corresponding function prompt information of each key of the remote controller in the service content, and operation method prompt information of each function in the service content.

Specifically, the judging whether a user operation satisfies a preset instruction condition according to the operation instruction includes:

judging whether an operation combination formed by respective operation instructions within a preset time satisfies a preset expected service content calling instruction condition.

Specifically, if the user operation satisfies the preset instruction condition, the displaying operation instruction information of the remote controller on a user operation interface includes:

if the operation combination formed by respective operation instructions within the preset time satisfies the expected service content calling instruction condition, displaying the operation instruction information of the remote controller on the user operation interface, wherein, the operation instruction information of the remote controller includes prompt information of a method for jumping from the current service content to the expected service content, corresponding function prompt information of each key of the remote controller in the expected service content, and operation method prompt information of each function in the expected service content.

An operation instructing apparatus for a remote controller of an intelligent television, including:

an operation instruction receiving unit configured to receive an operation instruction of the remote controller;

a judging unit configured to judge whether a user operation satisfies a preset instruction condition according to the operation instruction received by the operation instruction receiving unit;

a displaying unit configured to display operation instruction information of the remote controller on a user operation interface when the judging unit judges that the user operation satisfies the preset instruction condition, the operation instruction information being indicative of an operation of the remote controller.

In addition, the judging unit is specifically configured to judge whether an operation record of a service content corresponding to the operation instruction is locally stored.

When no operation record of the service content is locally stored, the displaying unit is specifically configured to display the operation instruction information of the remote controller on the user operation interface, wherein, the operation instruction information of the remote controller includes corresponding function prompt information of each key of the remote controller in the service content, and operation method prompt information for each function in the service content.

Further, the operation instructing apparatus for a remote controller of an intelligent television further includes an operation time determining unit and a time judging unit;

when an operation record of the service content is locally stored, the operation time determining unit acquires the latest operation time corresponding to the operation record;

the time judging unit judges whether the time difference between the latest operation time and the current time is larger than a preset time threshold.

In addition, when the time difference is larger than the preset time threshold, the displaying unit is specifically configured to display the operation instruction information of the remote controller on the user operation interface, wherein, the operation instruction information of the remote controller includes corresponding function prompt information of each key of the remote controller in the service content, and operation method prompt information for each function in the service content.

In addition, the judging unit is specifically configured to judge whether the number of misoperations on a service content locally stored is larger than or equal to a preset misoperation number threshold.

When the number of misoperations on the service content is a r than or equal to the misoperation number threshold, the displaying unit is specifically configured to display the operation instruction information of the remote controller on the user operation interface, wherein, the operation instruction information of the remote controller includes corresponding function prompt information of each key of the remote controller in the service content, and operation method prompt information of each function in the service content.

In addition, the judging unit is specifically configured to judge whether an operation combination formed by respective operation instructions within a preset time satisfies a preset expected service content calling instruction condition.

When the operation combination formed by respective operation instructions within the preset time satisfies the expected service content calling instruction condition, the displaying unit is specifically configured to display the operation instruction information of the remote controller on the user operation interface, wherein, the operation instruction information of the remote controller includes prompt information of a method for jumping from the current service content to the expected service content, corresponding function prompt information of each key of the remote controller in the expected service content, and operation method prompt information of each function in the expected service content.

An operation instructing method and apparatus for a remote controller of an intelligent television provided by the embodiments of the present disclosure can judge, after receiving an operation instruction from the remote controller, whether a user operation satisfies a preset instruction condition according to the operation instruction; and if so, can display operation instruction information of the remote controller on a user operation interface, the operation instruction information being indicative of an operation of the remote controller. By displaying the operation instruction of the remote controller, the present disclosure solves the problem in the prior art that since the service contents in the current intelligent television are numerous, and the operation mode varies with the service content, a misoperation will easily occur when certain service content is operated in a conventional operation mode, and the application of the service content is tedious and complex.

BRIEF DESCRIPTIONS OF THE DRAWINGS

In order to more clearly describe the technical solutions in the embodiments of the present disclosure or the prior art, the accompanying drawings to be used in the descriptions of the embodiments or the prior art will be briefly introduced as follows. Obviously, the accompanying drawings in the following descriptions just illustrate some embodiments of the present disclosure, and a person skilled in the art can obtain other accompanying drawings from them without paying any creative effort.

DETAILED DESCRIPTIONS

The technical solutions in the embodiments of the present disclosure will be clearly and completely described as follows with reference to accompanying drawings of the embodiments of the present disclosure. Obviously, those described herein are just parts of the embodiments of the present disclosure rather than all the embodiments. Based on the embodiments of the present disclosure, any other embodiment obtained by a person skilled in the art without paying any creative effort shall fall within the protection scope of the present disclosure.

Figure 1:
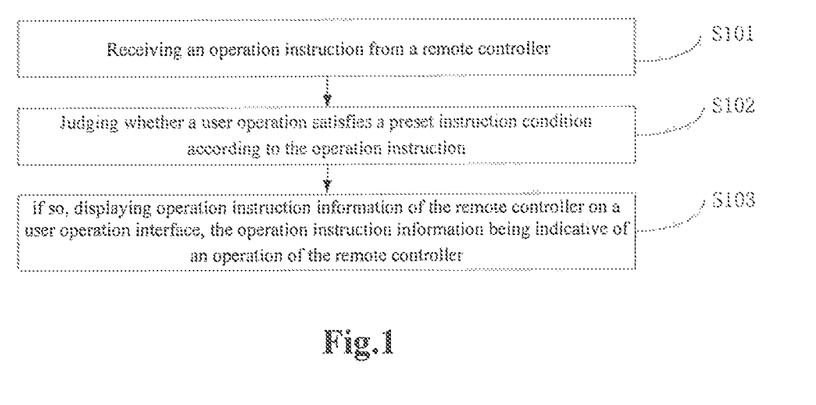
FIG. 1 is a flow diagram of an operation instructing method for a remote controller of an intelligent television provided by an embodiment of the present disclosure.

As illustrated in FIG. 1, an operation instructing method for a remote controller of an intelligent television provided by an embodiment of the present disclosure includes:

step 101: receiving an operation instruction from a remote controller;

step 102: judging whether a user operation satisfies a preset instruction condition according to the operation instruction;

step 103: if so, displaying operation instruction information of the remote controller on a user operation interface, the operation instruction information being indicative of an operation of the remote controller.

To be noted, the embodiment of the present disclosure is performed by an operation instructing apparatus for a remote controller of an intelligent television, which can be disposed in a set-top box of the intelligent television, but not limited thereto.

The operation instructing method for the remote controller of the intelligent television provided by the embodiment of the present disclosure can judge, after receiving an operation instruction from the remote controller, whether a user operation satisfies a preset instruction condition according to the operation instruction; and if so, can display operation instruction information of the remote controller on a user operation interface, the operation instruction information being indicative of an operation of the remote controller. By displaying the operation instruction of the remote controller, the present disclosure solves the problem in the prior art that since the service contents in the current intelligent television are numerous, and the operation mode varies with the service content, a misoperation will easily occur when certain service content is operated in a conventional operation mode, and the application of the service content is tedious and complex.

In step 102, judging whether a user operation satisfies a preset instruction condition according to the operation instruction can be implemented as follows:

judging whether an operation record of a service content selected by the operation instruction is locally stored.

The service content in the present disclosure may be, but not limited to, live video, video on demand, electronic game, television and broadcast, public service information, government messages, etc. The operation record of the service content can be locally stored in, but not limited to, the set-top box of the intelligent television.

The operation record of the service content may be, but not limited to, time, specific operational motions, etc. for applying various service contents.

The preset instruction condition may be that when no operation record of a service content is locally stored, i.e., the service content is used initially, the operation instruction information of the remote controller can be displayed on the user operation interface, wherein, the operation instruction information of the remote controller includes corresponding function prompt information of each key of the remote controller in the service content, and operation method prompt information for each function in the service content. Thus, when initially applying a certain service content, the user can be prompted how to apply the service content, so as to avoid the user's misoperation.

Figure 2:
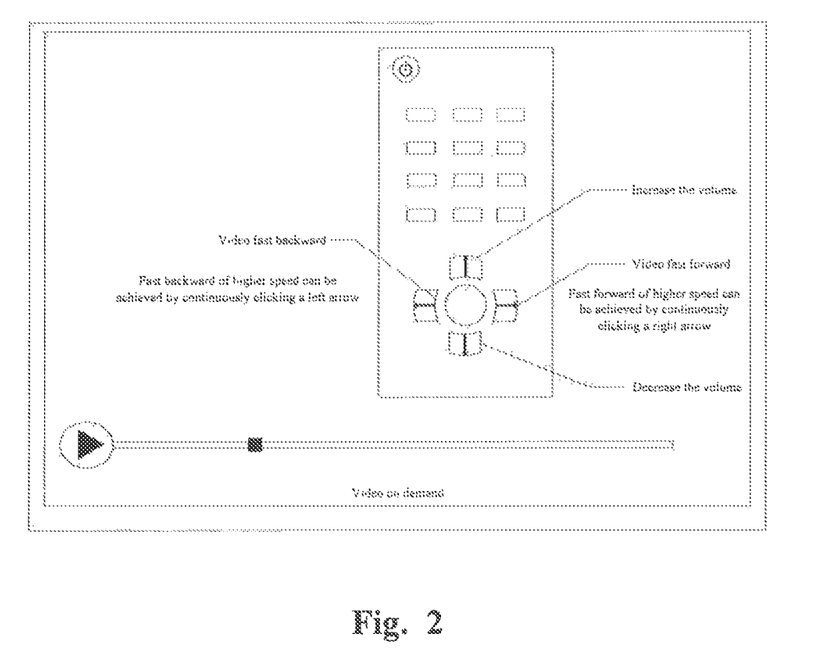
FIG. 2 is a schematic diagram of function prompt of each key of a remote controller provided by an embodiment of the present disclosure.

For example, in the service content of video on demand, when a service content of video on demand is initially applied, the function prompt information of each key of the remote controller as illustrated in FIG. 2 can be displayed. For instance, the up arrow indicates increasing the volume, the down arrow indicates decreasing the volume, the left arrow indicates video fast backward, and the right arrow indicates video fast forward. In addition, in the service content of video on demand, there may be the functions of speeded-up fast forward and speeded-up fast backward. For example, four times fast forward can be achieved by double-clicking the right arrow, and four times fast backward can be achieved by double-clicking the left arrow. Moreover, each service content has many functions, such as the game function in the service content of electronic game, the browsing function of the public service information, etc. which are omitted herein.

In addition, if an operation record of the service content is locally stored, operation time corresponding to the operation record can be further acquired to determine the latest operation time. Next, it is judged whether a time difference between the latest operation time and the current time is larger than a preset time threshold.

The preset instruction condition in step 102 may be that the time difference is larger than the preset time threshold. When the time difference is larger than the preset time threshold, it means that the user does not apply a certain service content during a long time period, and the operation instruction information of the remote controller can be displayed on the user operation interface. Thus, when the user does not apply a certain service content during a long time period, in order to prevent any misoperation on the service content by the user, the user can be prompted how to apply the service content, i.e., corresponding function prompt information of each key of the remote controller in the service content, and operation method prompt information of each function in the service content will be displayed. The corresponding function prompt information of each key of the remote controller in the service content, and operation method prompt information of each function in the service content can be exhibited by static pictures or animations.

In step 102, judging whether a user operation satisfies a preset instruction condition according to the operation instruction can also be implemented as follows:

judging whether the number of misoperations on a service content locally stored is larger than or equal to a preset misoperation number threshold.

The preset instruction condition may be that the number of misoperations on a service content is larger than or equal to a preset misoperation number threshold.

If the number of misoperations on the service content is larger than or equal to the preset misoperation number threshold, it means that the user performs multiple misoperations, i.e., the user may not acquire the operation mode of the service content, thus the operation instruction information of the remote controller can be displayed on the user operation interface. The operation instruction information of the remote controller includes corresponding function prompt information of each key of the remote controller in the service content, and operation method prompt information of each function in the service content.

The number of misoperations on each service content can be locally stored, and the above misoperations on the service content for example may be as follows. In the service content of video on demand, the up arrow and the down arrow on the remote controller indicate the channel switching, and the left arrow and the right arrow indicate the volume adjustment. If the user continuously takes the following actions within a short period of time, i.e., switching to another channel, then returning to the original channel, and adjusting the volume, it means that the user wants to adjust the volume, while performing a misoperation of channel switching. In that case, one misoperation can be locally recorded; if the misoperation appears again, two misoperations will be locally recorded, and so on. When the number of misoperations is too large and the operation instruction information of the remote controller is displayed on the user operation interface, the number of the local misoperations can be set as 0 for recounting when any misoperation appears subsequently.

In step 102, judging whether a user operation satisfies a preset instruction condition according to the operation instruction can also be implemented as follows:

judging whether an operation combination formed by respective operation instructions within a preset time satisfies a preset expected service content calling instruction condition.

The preset instruction condition may be that an operation combination formed by respective operation instructions within a preset time satisfies a preset expected service content calling instruction condition. That is, after the user performs a series of operations, it can be judged that the user may want to apply a certain service content. For example, in the service content of live video, when the user continuously switches between a plurality of sports channels, the sports game wanted to be watched by the user can be determined, i.e., a service content of sports channel program list shall be applied.

If the operation combination formed by respective operation instructions within the preset time satisfies the expected service content calling instruction condition, the user operation interface displays the operation instruction information of the remote controller, which includes prompt information of a method for jumping from the current service content to the expected service content, corresponding function prompt information of each key of the remote controller in the expected service content, and operation method prompt information of each function in the expected service content.

For example, as described above, the service content of sports channel program list shall be applied, while the current service content still may be a certain live video channel, then the user can be prompted to switch to the main menu for seeking a sports channel program list therein, so as to find the required live video channel quickly.

Figure 3:
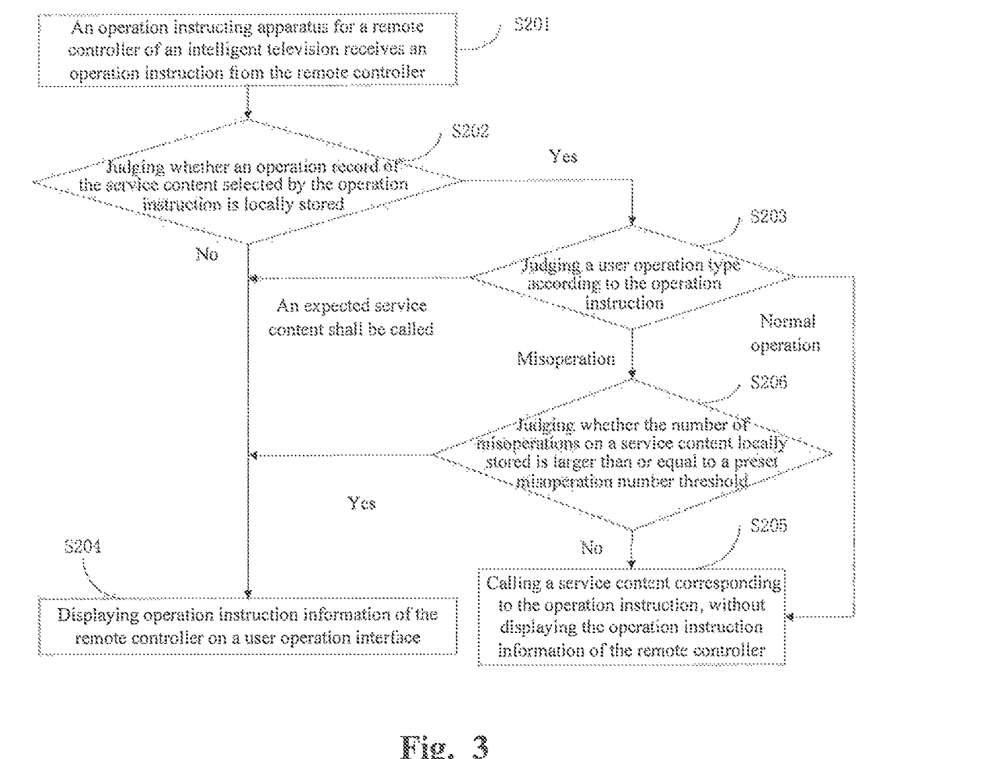
FIG. 3 is a flow diagram of an operation instructing method for a remote controller of an intelligent television provided by an embodiment of the present disclosure.

As illustrated in FIG. 3, an operation instructing method for a remote controller of an intelligent television provided by an embodiment of the present disclosure will be described as follows through a specific example.

Step 201: an operation instructing apparatus for a remote controller of an intelligent television receives an operation instruction from the remote controller.

Step 202: judging whether an operation record of a service content selected by the operation instruction is locally stored; if so, performing step 203, otherwise performing step 204.

Step 203: judging the user operation type according to the operation instruction.

If the user operation type is a normal operation, performing step 205; if the user operation type is a misoperation, performing step 206; and if the user operation type is that an expected service content shall be called, performing step 204.

Step 204: displaying operation instruction information of the remote controller on the user operation interface.

The operation instruction information of the remote controller includes corresponding function prompt information of each key of the remote controller in the service content, and operation method prompt information for each function in the service content. Or, the operation instruction information of the remote controller includes prompt information of a method for jumping from the current service content to the expected service content, corresponding function prompt information of each key of the remote controller in the expected service content, and operation method prompt information of each function in the expected service content.

Step 205: calling a service content corresponding to the operation instruction, without displaying the operation instruction information of the remote controller.

Step 206: judging whether the number of misoperations on a service content locally stored is larger than or equal to a preset misoperation number threshold; if so, performing step 204, otherwise performing step 205.

The embodiment as illustrated in FIG. 3 is just an embodiment of the operation instructing method for the remote controller of the intelligent television, and any other embodiment obtained by a person skilled in the art without paying a creative effort shall fall within the protection scope of the present disclosure.

Figure 4:
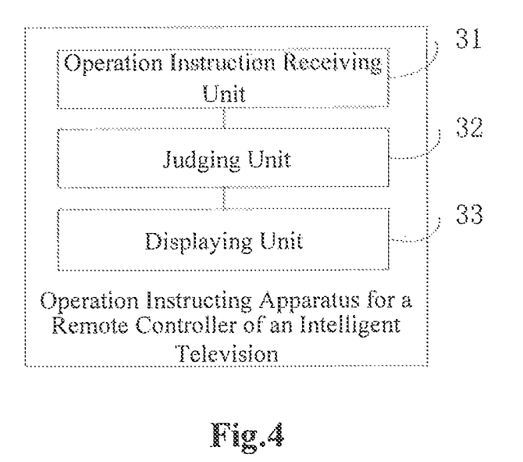
FIG. 4 is a structure diagram of an operation instructing apparatus for a remote controller of an intelligent television provided by an embodiment of the present disclosure.

As illustrated in FIG. 4, an operation instructing apparatus for a remote controller of an intelligent television provided by an embodiment of the present disclosure includes:

an operation instruction receiving unit 31 configured to receive an operation instruction of the remote controller.

a judging unit 32 configured to judge whether a user operation satisfies a preset instruction condition according to the operation instruction received by the operation instruction receiving unit 31.

a displaying unit 33 configured to display operation instruction information of the remote controller on a user operation interface when the judging unit 32 judges that the user operation satisfies the preset instruction condition, the operation instruction information being indicative of an operation of the remote controller.

Further, the judging unit 32 can be configured to judge whether an operation record of a service content corresponding to the operation instruction is locally stored.

When no operation record of the service content is locally stored, the displaying unit 33 is specifically configured to display the operation instruction information of the remote controller on the user operation interface, wherein, the operation instruction information of the remote controller includes corresponding function prompt information of each key of the remote controller in the service content, and operation method prompt information for each function in the service content.

Figure 5:
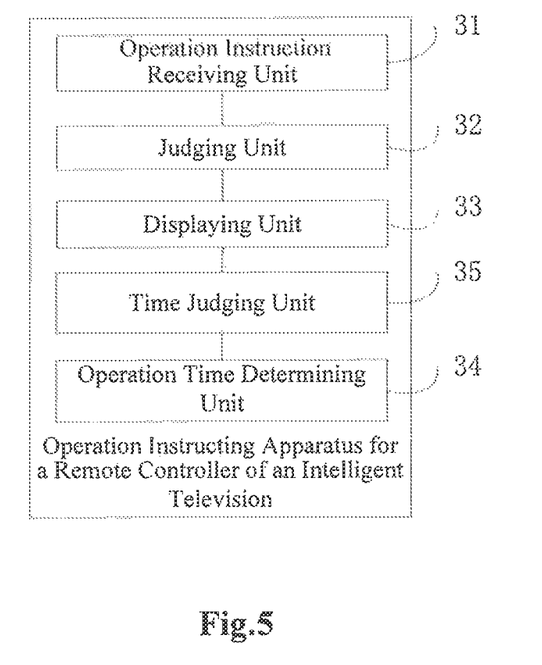
FIG. 5 is a structure diagram of an operation instructing apparatus for a remote controller of an intelligent television provided by an embodiment of the present disclosure.

Further, as illustrated in FIG. 5, the operation instructing apparatus for the remote controller of the intelligent television also includes an operation time determining unit 34 and a time judging unit 35.

When an operation record of the service content is locally stored, the operation time determining unit 34 acquires the latest operation time corresponding to the operation record.

The time judging unit 35 judges whether the time difference between the latest operation time and the current time is larger than a preset time threshold.

When the time difference is larger than the preset time threshold, the displaying unit 33 can display the operation instruction information of the remote controller on the user operation interface. The operation instruction information of the remote controller includes corresponding function prompt information of each key of the remote controller in the service content, and operation method prompt information for each function in the service content.

Further, as illustrated in FIG. 5, the judging unit 32 can judge whether the number of misoperations on a service content locally stored is larger than or equal to a preset misoperation number threshold.

When the number of misoperations on the service content is larger than or equal to the misoperation number threshold, the displaying unit 33 is specifically configured to display the operation instruction information of the remote controller on the user operation interface. The operation instruction information of the remote controller includes corresponding function prompt information of each key of the remote controller in the service content, and operation method prompt information of each function in the service content.

Further, as illustrated in FIG. 5, the judging unit 35 can judge whether an operation combination formed by respective operation instructions within a preset time satisfies a preset expected service content calling instruction condition.

When the operation combination formed by respective operation instructions within the preset time satisfies the expected service content calling instruction condition, the displaying unit 33 can display the operation instruction information of the remote controller on the user operation interface. The operation instruction information of the remote controller includes prompt information of a method for jumping from the current service content to the expected service content, corresponding function prompt information of each key of the remote controller in the expected service content, and operation method prompt information of each function in the expected service content.

To be noted, please refer to the method embodiments as illustrated in FIGS. 1 and 3 for the specific manners of implementing the operation instructing apparatus for the remote controller of the intelligent television provided by the embodiment of the present disclosure, which are omitted herein.

The operation instructing apparatus for the remote controller of the intelligent television provided by the embodiment of the present disclosure can judge, after receiving an operation instruction from the remote controller, whether a user operation satisfies a preset instruction condition according to the operation instruction; and if so, can display operation instruction information of the remote controller on a user operation interface, the operation instruction information being indicative of an operation of the remote controller. By displaying the operation instruction of the remote controller, the present disclosure solves the problem in the prior art that since the service contents in the current intelligent television are numerous, and the operation mode varies with the service content, a misoperation will easily occur when certain service content is operated in a conventional operation mode, and the application of the service content is tedious and complex.

A person skilled in the art shall understand that the embodiments of the present disclosure can be provided as a method, a system or a computer program product. Therefore, the present disclosure can take the form of a full hardware embodiment, a full software embodiment, or an embodiment with combination of software and hardware aspects. Moreover, the present disclosure can take the form of a computer program product implemented on one or more computer usable storage mediums (including, but not limited to, a magnetic disc memory, CD-ROM, optical storage, etc.) containing therein computer usable program codes.

The present disclosure is described with reference to a flow diagram and/or block diagram of the method, device (system) and computer program product according to the embodiments of the present disclosure. It shall be understood that each flow and/or block in the flow diagram and/or block diagram and a combination of the flow and/or block in the flow diagram and/or block diagram can be realized by the computer program instructions. These computer program instructions can be provided to a general computer, a dedicated computer, an embedded processor or a processor of other programmable data processing device to generate a machine, such that the instructions performed by the computer or the processor of other programmable data processing devices generate the device for implementing the function designated in one flow or a plurality of flows in the flow diagram and/or a block or a plurality of blocks in the block diagram.

These computer program instructions can also be stored in a computer readable memory capable of directing the computer or other programmable data processing devices to operate in a specific manner, such that the instructions stored in the computer readable memory generate a manufactured article including an instruction device that implements the function(s) designated in one flow or a plurality of flows in the flow diagram and/or a block or a plurality of blocks in the block diagram.

These computer program instructions can also be loaded onto the computer or other programmable data processing devices, such that a series of operation steps is executed on the computer or other programmable devices to generate the processing realized by the computer, therefore the instructions executed on the computer or other programmable devices provide the steps for implementing the function designated in one flow or a plurality of flows in the flow diagram and/or a block or a plurality of blocks in the block diagram.

The principle and the implementation of the present disclosure are described through the specific embodiments, which are only used to help understanding the method and the core idea of the present disclosure. Meanwhile, a person skilled in the art can change the implementation and the application range according to the idea of the present disclosure. In conclusion, this specification should not be construed as any limitation to the present disclosure.

The invention claimed is:

1. An operation instructing method for a remote controller of an intelligent television, comprising:
   receiving, at an operation-instruction receiving unit of an operation instructing apparatus for the remote controller, an operation instruction from the remote controller;
   judging at a judging unit of the operation instructing apparatus, based on the operation instruction, whether a user operation satisfies a preset instruction condition; and
   upon judging that the user operation satisfies the preset instruction condition, displaying by a displaying unit of the operation instructing apparatus, operation instruction information for the remote controller on a user operation interface, the operation instruction information being indicative of an operation of the remote controller;
   wherein:
   judging, based on the operation instruction, whether the user operation satisfies the preset instruction condition comprises judging whether an operation record of a service content corresponding to the operation instruction is locally stored, displaying the operation instruction information for the remote controller on the user operation interface comprises upon judging that no operation record of the service content is locally stored, displaying the operation instruction information for the remote controller on the user operation interface, and the operation instruction information of the remote controller includes corresponding function prompt information for each key of the remote controller in the service content, and operation-method prompt information for each function in the service content; and wherein:

judging, based on the operation instruction, whether the user operation satisfies the preset instruction condition further comprises judging whether an operation combination formed by respective operation instructions within a preset time period satisfies a preset expected-service-content calling instruction condition;

displaying the operation instruction information for the remote controller on the user operation interface further comprises upon judging that the operation combination formed by respective operation instructions within the preset time period satisfies the expected-service-content calling instruction condition, displaying the operation instruction information for the remote controller on the user operation interface; and the operation instruction information for the remote controller includes:

prompt information for jumping from a current service content to an expected service content, corresponding function prompt information for each key of the remote controller in the expected service content, and operation-method prompt information for each function in the expected service content.

2. The operation instructing method according to claim 1, further comprising:

upon judging that an operation record of the service content is locally stored, acquiring a latest operation time corresponding to the operation record; and judging whether a time difference between the latest operation time and a current time is larger than a preset time threshold.

3. The operation instructing method according to claim 2, wherein displaying operation instruction information for the remote controller on the user operation interface comprises:

upon judging that the time difference is larger than the preset time threshold, displaying the operation instruction information for the remote controller on the user operation interface, wherein the operation instruction information for the remote controller includes:

corresponding function prompt information for each key of the remote controller in the service content, and operation-method prompt information for each function in the service content.

4. The operation instructing method according to claim 1, wherein judging based on the operation instruction, whether the user operation satisfies the preset instruction condition further comprises:

judging whether a number of misoperations on a service content locally stored is larger than or equal to a preset misoperation number threshold.

5. The operation instructing method according to claim 4, wherein displaying operation instruction information for the remote controller on the user operation interface comprises:

upon judging that the number of misoperations on the service content is larger than or equal to the misoperation number threshold, displaying the operation instruction information for the remote controller on the user operation interface, wherein the operation instruction information for the remote controller includes:

corresponding function prompt information for each key of the remote controller in the service content, and operation-method prompt information of each function in the service content.

6. An operation instructing apparatus for a remote controller of an intelligent television, comprising:

one or more processors;

memory; and one or more programs stored in the memory and configured to be executed by the one or more processors, wherein the one or more programs include instructions that, when executed by the one or more processors, cause the operation instructing apparatus to:

receive an operation instruction for the remote controller;

judge whether a user operation satisfies a preset instruction condition according to the received operation instruction; and cause display of operation instruction information for the remote controller on a user operation interface when the operation instructing apparatus judges that the user operation satisfies the preset instruction condition, the operation instruction information being indicative of an operation of the remote controller, wherein:

judging, based on the operation instruction, whether the user operation satisfies the preset instruction condition comprises judging whether an operation record of a service content corresponding to the operation instruction is locally stored, causing display of the operation instruction information for the remote controller on the user operation interface comprises upon judging that no operation record of the service content is locally stored, causing display of the operation instruction information for the remote controller on the user operation interface, and the operation instruction information of the remote controller includes corresponding function prompt information for each key of the remote controller in the service content, and operation-method prompt information for each function in the service content; and wherein:

judging, based on the operation instruction, whether the user operation satisfies the preset instruction condition further comprises judging whether an operation combination formed by respective operation instructions within a preset time period satisfies a preset expected-service-content calling instruction condition;

causing display of the operation instruction information for the remote controller on the user operation interface comprises upon judging that the operation combination formed by respective operation instructions within the preset time period satisfies the expected-service-content calling instruction condition, causing display of the operation instruction information for the remote controller on the user operation interface; and the operation instruction information for the remote controller includes:

prompt information for jumping from a current service content to an expected service content, corresponding function prompt information for each key of the remote controller in the expected service content, and operation-method prompt information of each function in the expected service content.

7. The operation instructing apparatus according to claim 6, wherein the one or more programs further include instructions that, when executed by the one or more processors, cause the operating instructing apparatus to:

acquire the latest operation time corresponding to the operation record, when an operation record of the service content is locally stored; and judge whether a time difference between a latest operation time and a current time is larger than a preset time threshold.

8. The operation instructing apparatus according to claim 7, wherein:

when the time difference is larger than the preset time period threshold, the operation instructing apparatus causes display of the operation instruction information for the remote controller on the user operation interface, wherein the operation instruction information of the remote controller includes:

corresponding function prompt information for each key of the remote controller in the service content, and operation-method prompt information for each function in the service content.

9. The operation instructing apparatus according to claim 6, wherein the operation instructing apparatus judges whether a number of misoperations on a service content locally stored is larger than or equal to a preset misoperation number threshold.

10. The operation instructing apparatus according to claim 9, wherein:

when the number of misoperations on the service content is larger than or equal to the misoperation number threshold, the operation instructing apparatus causes display of the operation instruction information for the remote controller on the user operation interface, wherein the operation instruction information of the remote controller includes:

corresponding function prompt information for each key of the remote controller in the service content, and operation-method prompt information of each function in the service content.

* * * * *